United States Patent [19]
Mantell et al.

[11] Patent Number: 5,641,346
[45] Date of Patent: Jun. 24, 1997

[54] INK JET INK COMPOSITIONS AND RECORDING PROCESSES

[75] Inventors: David Allen Mantell, Rochester; Bing R. Hsieh, Webster; William M. Schwarz, Webster; Ian D. Morrison, Webster; Michael P. O'Horo, Fairport; Joseph J. Wysocki, Webster; Kurt B. Gundlach, Pittsford; Min-Hong Fu; Dale R. Ims, both of Webster, all of N.Y.

[73] Assignee: Xerox Corporation, Stamford, Conn.

[21] Appl. No.: 572,254

[22] Filed: Dec. 13, 1995

[51] Int. Cl.$^6$ .................................... C09D 11/02
[52] U.S. Cl. ................ 106/31.58; 522/64; 522/54; 522/67; 347/100
[58] Field of Search ................... 106/20 R, 20 D, 106/22 R

[56] References Cited

U.S. PATENT DOCUMENTS

| | | | |
|---|---|---|---|
| 4,303,924 | 12/1981 | Young, Jr. | 106/22 B |
| 4,334,970 | 6/1982 | Lombardi et al. | 204/159.15 |
| 4,395,287 | 7/1983 | Kobayashi et al. | 106/20 R |
| 4,443,495 | 4/1984 | Morgan et al. | 427/96 |
| 4,463,359 | 7/1984 | Ayata et al. | 346/1.1 |
| 4,500,355 | 2/1985 | Shimada et al. | 106/22 R |
| 4,680,368 | 7/1987 | Nakamoto et al. | 528/49 |
| 4,751,102 | 6/1988 | Adair et al. | 427/53.1 |
| 4,840,674 | 6/1989 | Schwarz | 106/22 R |
| 4,978,969 | 12/1990 | Chieng | 346/1.1 |
| 5,268,027 | 12/1993 | Chan et al. | 106/20 R |
| 5,275,646 | 1/1994 | Marshall et al. | 106/20 D |
| 5,364,726 | 11/1994 | Morrison et al. | 430/115 |
| 5,371,531 | 12/1994 | Rezanka et al. | 347/43 |
| 5,389,133 | 2/1995 | Gundlach et al. | 106/22 H |
| 5,395,724 | 3/1995 | Morrison et al. | 430/115 |

*Primary Examiner*—Helene Klemanski
*Attorney, Agent, or Firm*—Oliff & Berridge

[57] ABSTRACT

An ink jet ink includes a colorant and a liquid component containing at least one of an epoxy and a vinyl ether. Water may also be dissolved in the liquid component. Preferably, the vinyl ether is ethylene glycol monovinyl ether. An ink jet recording process includes the steps of ejecting an ink jet ink, such as the inks of the present invention, from an orifice to form an image on a recording medium.

32 Claims, No Drawings

INK JET INK COMPOSITIONS AND RECORDING PROCESSES

BACKGROUND OF THE INVENTION

This invention relates to inks for ink jet printers, more particularly, for thermal ink jet printers. The invention further relates to an ink jet recording process.

In existing thermal ink jet printing, the printhead comprises one or more ink filled channels, such as disclosed in U.S. Pat. No. 4,463,359 to Ayata et al. At one end, these channels communicate with a relatively small ink supply chamber. At the opposite end, the channels have an opening referred to as a nozzle. A thermal energy generator, for example a resistor, is located in each of the channels a predetermined distance from the nozzles. The resistors are individually addressed with a current pulse to momentarily vaporize ink in the respective channels and thereby form a bubble. As a bubble grows, the ink bulges from the nozzle, but it is contained by the surface tension of the ink as a meniscus. As the bubble begins to collapse, the ink still in the channel between the nozzle and the bubble starts to move towards the collapsing bubble, causing a volumetric contraction of the ink at the nozzle, resulting in the separation of the bulging ink as an ink droplet. The acceleration of the ink out of the nozzle while the bubble is growing provides momentum and velocity to the droplet in a substantially straight line direction towards a recording medium, such as paper.

Water is generally thought to be an ideal jetting material. It forms bubbles with the largest possible volume expansion upon vaporization. However, although approximately a third of the heat from the heater is deposited into the ink, only a small portion of this heat is actually used to form a bubble. The rest of the heat is conducted too far into the ink to be used.

As the bubble is forming, it is nucleated in a thin layer above the heater. Its growth is fed initially by the high pressure in the newly formed bubble and, in addition, by the transfer of heat and evaporation of ink from the liquid-gas interface. Ultimately, the ink cools below the liquid boiling point and bubble expansion continues due to momentum alone.

Although water is ideal for forming the bubble, once the image has been formed on the recording medium, the image tends to smear since water tends to remain on the surface of the medium and is not curable. Therefore, it would be desirable to form an ink that can form a sufficient bubble but at the same time can be cured once the image has been formed on the recording medium.

In addition, water tends to cause cockle and curl in the recording medium. Therefore it would be desirable to form an ink that will reduce or eliminate the cockle and curl of the recording medium that results from known water-based inks.

Curable inks are known in the printing industry. For example, U.S. Pat. No. 4,680,368 to Nakamoto et al. discloses an ultraviolet curable ink composition comprising a polyurethane polymethacrylate obtained by reacting a polyisocyanate compound of the formula:

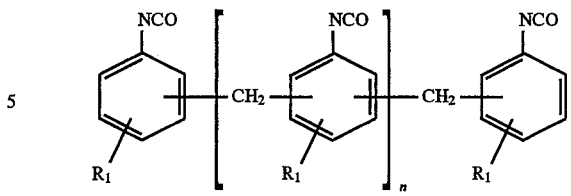

wherein $R_1$ is a hydrogen atom or a methyl group, and n is an integer of from 1 to 20, with a hydroxyl group containing methacrylate and having in one molecule at least two methacryloyl groups and at least two urethane bonds, a radical polymerizable low molecular weight compound, and a photopolymerization initiator.

In addition, U.S. Pat. No. 4,443,495 to Morgan et al. discloses a heat curable conductive ink that comprises (1) an ethylenically unsaturated member of the group consisting of (a) a liquid ethylenically unsaturated monomer or oligomer of the formula:

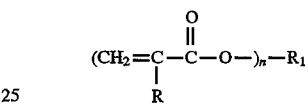

wherein R is H or $CH_3$, $R_1$ is an organic moiety and n is at least 2, (b) a polythiol in combination with (a), (c) a polythiol in combination with a liquid ethylenically unsaturated monomer or oligomer of the formula:

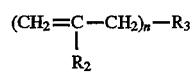

wherein $R_2$ is H or $CH_3$, $R_3$ is an organic moiety and n is at least 2, and (d) mixtures of (a), (b), and (c); (2) a thermal initiator; and (3) an electrically conductive material. Heating of the composition in a desired pattern on a substrate results in a printed electric circuit.

Further, U.S. Pat. No. 4,751,102 to Adair et al. discloses a radiation curable ink composition comprising pigment and a photohardenable composition. The photohardenable composition comprises a free radical polymerizable or cross-linkable compound and an ionic dye reactive counter ion compound that is capable of absorbing actinic radiation and producing free radicals that initiate free radical polymerization or cross-linking of the polymerizable or cross-linkable compounds.

U.S. Pat. No. 4,334,970 to Lombardi et al. discloses a photosensitive resin system that is essentially solvent-free and contains an ester produced from an unsaturated organic acid and a polyhydroxyl containing material, a photoinitiator, a carbonyl initiator, a monomer capable of reacting with an acrylic monomer, and an unsaturated hydroxyl containing polymer hydrocarbon.

U.S. Pat. No. 5,395,724 to Morrison et al. discloses a liquid developer containing a curable liquid vehicle including epoxies, vinyl ethers, styrenes, indenes, vinyl acetals, ketene acetals, aliphatic α-olefins and/or mixtures thereof. The reference does not teach ink jet inks or an ink jet printing process. In addition, the reference does not teach a composition comprising ethylene glycol monovinyl ether. Further, the reference does not teach adding water to the curable liquid vehicle. In fact, adding water to the developer would cause the developer to be conductive and thereby interfere with its function as a developer.

One potential difficulty with the use of curable inks containing a photoinitiator is that the ink may be subject to premature polymerization. For example, if enough stray light enters the nozzles of the printhead, polymerization can be initiated, destroying the ink and potentially destroying the printhead. One possible solution is to increase the tolerance of the ink to stray light, however, this increases the delay in the onset of polymerization even after printing, potentially reducing the achievable image quality. In addition, because of high printer through-put or because of rapid wicking of the ink along paper fibers, rapid curing of the ink may be required. Although the speed of curing may be increased by using a high intensity light source, which provides rapid curing, such a light source also generates a considerable amount of ozone, requiring safety precautions that may be unacceptable in some products.

SUMMARY OF THE INVENTION

The present invention provides an ink, particularly for a thermal ink jet printing process, that is curable. It also provides an ink with sufficiently large bubble sizes comparable to those of water based inks. The present invention also provides inks that produce high quality images with low or no cockle or curl of the printed recording media.

The present invention further provides an ink comprising a liquid component containing an epoxy or a vinyl ether or a mixture thereof. Preferably, the vinyl ether is a glycol vinyl ether, more preferably ethylene glycol monovinyl ether. The ink may also comprise water.

Additionally, the present invention is directed to an ink jet recording process, preferably a thermal ink jet process, comprising ejecting droplets of an ink jet ink, such as the inks of the present invention, from an orifice to form an image on a recording medium.

DETAILED DESCRIPTION OF PREFERRED EMBODIMENTS

An embodiment of the present invention is directed to an ink jet ink comprising a liquid component containing a vinyl ether or an epoxy or a mixture thereof. Another embodiment is directed to an ink jet recording process, preferably a thermal ink jet recording process, using an ink containing a vinyl ether or an epoxy or a mixture thereof.

Inks containing these compounds have been found to form a sharper image on a recording substrate such as paper and transparencies. In addition, inks containing these compounds have good bubble formation.

In an embodiment of the present invention, the liquid component is curable. For the liquid component to be curable, generally, a curable liquid containing a vinyl ether or an epoxy or a mixture thereof forms a substantial part of the liquid component of the ink. Preferably at least 65% by weight of the liquid component is the curable liquid. More preferably, from 70 to 95% by weight of the liquid component is the curable liquid.

Generally, any epoxy compound, including mono-, bi-, tri- and multi-functional epoxies, can be used in the present invention. Examples of epoxy compounds that can be used in the present invention include, but are not limited to, 1,4-butanediol diglycidyl ether, 3-(bis(glycidyloxymethyl) methoxy)-1,2-propanediol, Limonene oxide, 2-biphenyl glycidyl ether, 3,4-epoxycyclohexylmethyl-3',4'-epoxycyclohexane carboxylate, bisphenol A diglycidyl ether, and the like.

Vinyl ethers that may be used in the present invention have the following formula:

R—O—CH=CH$_2$ wherein R represents an organic moiety. Examples of organic moieties include, but are not limited to, substituted and unsubstituted alkyls, particularly those containing from 1 to 20 carbon atoms in the alkyl chain, glycol containing groups, particularly those containing repeating units of ethylene oxide, and the like. Examples of suitable vinyl ethers include, but are not limited to, decyl vinyl ether, triethylene glycol divinyl ether, ethylene glycol divinyl ether, diethylene glycol divinyl ether, ethylene glycol monovinyl ether, triethylene glycol methyl monovinyl ether, 1,6-hexanediol monovinyl ether, 1,6-hexanediol divinyl ether, tetraethyleneglycol divinyl ether, polytetrahydrofuran divinyl ether, trimethylolpropane trivinyl ether, α-ethenyl-ω-(ethenyloxy)poly(oxy-1,2-ethanediyl) and t-amyl-vinyl ether.

In an embodiment of the present invention, the vinyl ether is a glycol vinyl ether. Preferably, the glycol vinyl ether is ethylene glycol monovinyl ether. Inks containing glycol vinyl ethers more rapidly penetrate the recording media than water based inks. As a result, the images have low levels of intercolor bleed. In addition, the images are highly smear proof and waterfast. In addition, images formed using these inks cause no or low cockle and curl of the recording medium.

In a preferred embodiment of the present invention, water is slightly soluble in the vinyl ether and/or epoxy used to form the liquid component. For example, in a preferred embodiment, the vinyl ether or epoxy can form a solution with water containing at least 1% by weight water. More preferably, the vinyl ether or epoxy can form a solution with water containing at least 5% by weight water. Examples of vinyl ethers that can form a solution with water include, but are not limited to, ethylene glycol monovinyl ether and triethylene glycol methyl monovinyl ether.

In embodiments, the ink also contains water. The addition of water allows for the formation of bigger bubbles and increases the jetting ability of the ink. Water may be added in any desired amount so long as the water is miscible in the liquid component. However, if too much water is added, a water phase may separate from the organic phase. In a preferred embodiment of the present invention, the liquid component contains less than about 50% by weight water. Cockle and curl in the recording medium can be further reduced if the liquid component contains less than about 40% by weight water. In an embodiment of the present invention, the liquid component contains from 20 to 50% by weight water.

The ink may contain other water soluble organic cosolvents to provide the ink with increased ability to dissolve water. Selection of a suitable water soluble organic solvent depends on requirements of the specific application, such as desired surface tension and viscosity, selected pigment or dye, drying time of the ink jet ink, and the type of recording medium onto which the ink will be printed. Suitable water soluble organic solvents include, but are not limited to, ethylene glycol, propylene glycol, diethylene glycols, glycerine, dipropylene glycols, polyethylene glycols, polypropylene glycols, amides, carboxylic acids, esters, alcohols, organosulfides, sulfones such as sulfolane, alcohol derivatives, carbitol, butyl carbitol, cellusolve, amino alcohols, ketones, N-methylpyrrolidinone, 2-pyrrolidone, cyclohexylpyrrolidone, hydroxyethers, sulfoxides such as dimethyl sulfoxide, lactones, mixtures thereof and the like.

When an additional cosolvent is used, the amount of cosolvent in the liquid component may be any effective amount. Typically the liquid component contains 0 to 50% by weight cosolvent. In a preferred embodiment, the liquid component contains from 10 to 30% by weight cosolvent. The amount may, of course, be outside these ranges so long as the objectives of the present invention are achieved. In addition to providing solubility, the cosolvent, when present, may serve as a humectant.

In a preferred embodiment, the inks are curable. To form a curable ink, the liquid component should contain less than about 25% by weight water. In a preferred embodiment, the liquid component contains from about 1 to about 10% by weight water. More preferably, the liquid component contains from about 3 to about 8% by weight water.

In other embodiments of the present invention, the inks may be free of water. Although water increases the jetting ability of the ink, if the ink can be sufficiently jetted without water, then eliminating the water is preferred. For example, the present inventors have found that inks containing ethylene glycol monovinyl ether can form sufficient bubbles and have sufficient jetting properties even without the addition of water. In a further preferred embodiment, the inks contain ethylene glycol monovinyl ether as well as other vinyl ethers and/or epoxies of the present invention.

In embodiments, the inks of the present invention may also contain salts that are soluble in the ink, particularly soft polarizable salts. Soluble salts include, but are not limited to, betaine, tetrapentylammonium bromide, lithium trifluoroacetate, mixtures thereof and the like. The salts may be included, for example, to deairate the inks and thereby further increase the jetting performance properties.

The inks of the present invention have increased waterfast properties and decreased cockle and curl, even without the addition of an initiator to initiate curing of the liquid vehicle. However, in embodiments of the present invention, the ink jet inks may further contain an initiator. The initiator can be added at any point in the printing process, such as before, during or after development of the image. Any suitable initiator can be employed provided that the objectives of the present invention are achieved.

Examples of the types of initiators suitable for inks of the present invention include, but are not limited to, thermal initiators; photoinitiators such as ultraviolet initiators, infrared initiators, visible light initiators, and the like; initiators sensitive to electron beam radiation, ion beam radiation, gamma radiation, and the like; mixtures thereof and the like. In a preferred embodiment, the initiator is a photoinitiator, particularly, an ultra-violet initiator. Such initiators are known in the art and are disclosed in, for example, U.S. Pat. No. 5,395,724 to Morrison et al., the disclosure of which is totally incorporated herein by reference.

Preferably, the initiator is a photoacid generating initiator. Examples of photoacid generating initiators are disclosed in: J. V. Crivello, "The Chemistry of Photoacid Generating Compounds," *Proceedings of the ACS Division of Polymeric Materials: Science and Engineering*, Vol. 61, pages 62–66, (1989); J. V. Crivello and J. H. W. Lam, "Redox Cationic Polymerization: The Diaryliodonium Salt/Ascorbate Redox Coupe," *Journal of Polymer Science: Polymer Chemistry Edition*, Vol. 19, pages 539–548 (1981); J. V. Crivello and J. L. Lee, "Redox-Induced Cationic Polymerization: The Diaryliodonium Salt/Benzoin Redox Couple," *Journal of Polymer Science: Polymer Chemistry Edition*, Vol. 21, pages 1097–1110 (1983); J. V. Crivello, T. P. Lockhart and J. L. Lee, "Diaryliodonium Salts as Thermal Initiators of Cationic Polymerization," *Journal of Polymer Science: Polymer Chemistry Edition*, Vol. 21, pages 97–109 (1983); and P. K. T. Oldring (ed.), "Chemistry and Technology of UV and E8 Formulation for Coatings, Inks and Paints: Vol. 3 Photoinitiators for Free Radical and Cationic Polymerization," SITA Technology Ltd, London, UK (1991), the disclosure of each of which is totally incorporated herein by reference.

Additional examples of suitable initiators are disclosed in, for example, U.S. Pat. Nos. 4,683,317, 4,378,277, 4,279, 717, 4,680,368, 4,443,495, 4,751,102, and 4,334,970; J. V. Crivello and J. H. W. Lam, "Complex Triarylsulfonium Salt Photoinitiators I. The Identification, Characterization, and Synthesis of a New Class of Triarylsulfonium Salt Photoinitiators," *Journal of Polymer Science: Polymer Chemistry Edition*, Vol. 18, 2677–2695 (1980); J. V. Crivello and J. H. W. Lam, "Complex Triarylsulfonium Photoinitiators II. The Preparation of Several New Complex Triarylsulfonium salts and the Influence of Their Structure in Photoinitiated Cationic Polymerization," *Journal of Polymer Science Polymer Chemistry Edition*, Vol. 18, pages 2697–2714 (1980); J. V. Crivello and J. H. W. Lam, "Diaryliodonium Salts A New Class of Photoinitiators for Cationic Polymerization," *Macromolecules*, Vol. 10, pages 1307–1315 (1977); and J. V. Crivello, J. L. Lee and D. A. Conlon, "Developments in the Design and Applications of Novel Thermal and Photochemical Initiators for Cationic Polymerization" *Makromol. Chem. Macromolecular Symposium*, Vol. 13/14, pages 134–160 (1988), the disclosure of each of which is totally incorporated herein by reference.

Particularly preferred are the diaryl iodonium salts and their derivatives, the triaryl sulfonium salts and their derivatives, and the triphenyl phosphonium salts and their derivatives, with examples of derivatives being those with alkyl, aryl, or alkoxy substituents on the aryl rings.

The initiator may be present in the liquid component in an effective amount, generally from about 0.1 to about 10 percent by weight of the liquid component, and more preferably from about 0.1 to about 3 percent by weight of the liquid component.

Inks of the present invention contain a colorant. Any colorant may be used to impart the desired color to the ink. In embodiments of the present invention the colorant may include at least one pigment, dye, or combination thereof.

A wide variety of organic and inorganic pigments, alone or in combination, may be selected for use in the ink compositions of this invention. The term "pigment" as used herein means a colorant that is insoluble in the liquid vehicle, and thus includes solid pigments and so-called called pigment dyes. The pigment particles should be sufficiently small to permit free flow of the ink through the ink jet printing device, especially at the ejecting nozzles that usually have a diameter ranging from 10 microns to 50 microns. The pigment particle size also has an influence on the pigment dispersion stability, which is critical throughout the life of the ink. It is also desirable to use small particles for maximum color strength.

Accordingly, in embodiments, the average particle diameter may be from about 0.005 microns to about 15 microns. Preferably, the pigment particle size may range from about 0.005 to about 5 microns, more preferably from about 0.005 to about 1 micron, and most preferably from about 0.005 to about 0.3 micron. Pigment particle sizes outside these ranges may, of course, be used so long as the objectives of the present invention are achieved.

The pigment can be black, cyan, magenta, yellow, red, blue, green, brown, mixtures thereof, and the like. For example, suitable pigment materials include carbon blacks such as Neptune Black. Additional examples of suitable pigments are disclosed in, for example, U.S. Pat. No. 5,389,133 to Gundlach et al., the entire disclosure of which is incorporated herein by reference.

The pigment may, but need not, be in the form of a dispersion comprising a dispersant. For example, the dispersant may be a polymeric dispersant. Polymeric dispersants suitable for practicing the invention include, but are not limited to, AB or BAB block copolymers wherein the A block is hydrophobic and serves to link with the pigment, and the B block is hydrophilic and serves to disperse the pigment in the medium. Selection of the polymeric dispersant for a specific application will depend on the selected pigment and liquid component and will be apparent to one skilled in the art. The polymeric dispersant also may be a polymer as described in U.S. Pat. No. 5,205,861, the entire disclosure of which is incorporated herein by reference.

Block copolymers that are useful as polymeric dispersants in the present invention generally have a number average molecular weight below about 20,000, preferably below about 15,000, and typically in a range of from about 1,000 to about 3,000. Preferred block copolymers have number average molecular weights in the range of from about 500 to about 1,500 for each A and B block.

In addition to or in place of a polymeric dispersant, surfactant compounds may be used as dispersants. These surfactant compounds may also serve to alter the surface tension of the ink as well as to promote penetration of the ink into the print medium. They may be anionic, cationic, nonionic or amphoteric dispersants, as necessary. A detailed list of non-polymeric as well as some polymeric dispersants appears in, for example, *McCutcheon's Functional Materials, North American Edition*, Manufacturing Confectioner Publishing Co., Glen Rock, N.J., pp. 110–129 (1990), the entire disclosure of which is incorporated herein by reference.

Although random copolymers can also be used as dispersants in embodiments of the invention, they are not as effective in stabilizing pigment dispersions. Among these may be mentioned half-esters of maleic acid/styrene copolymers, lignin sulfonate derivatives, copolymers of acrylic and methacrylic acid with styrene, and the like.

In embodiments of the present invention, the ink-jet ink can contain a dye instead of or in addition to pigment particles. Suitable dyes include Orasol Pink 5BLG, Black RLI, Blue 2GLN, Red G, Yellow 2GLN, Blue GN, Blue BLN, Black CN, and Brown CR, all available from Ciba-Geigy, Inc., Mississauga, Ontario; Morfast Blue 100, Red 101, Red 104, Yellow 102, Black 101, and Black 108, all available from Morton Chemical Company, Ajax, Ontario; Bismark Brown R, available from Aldrich; Neolan Blue, available from Ciba-Geigy; Savinyl Yellow RLS, Black RLS, Red 3 GLS, and Pink GBLS, all available from Sandox Company, Mississauga, Ontario; mixtures thereof and the like. Other examples include those disclosed in U.S. Pat. No. 5,389,133, referenced above.

In an embodiment of the present invention, Orasol spirit soluble dyes are preferred. They have good solubility in the inks of the present invention. In addition, inks containing these dyes have exceptional waterfastness.

The pigment and/or dye may be present in the ink composition in any effective amount, generally from about 1 to about 20 percent by weight of the ink. Preferably, in the case of dye-based inks, the ink contains 2 to 10 percent dye by weight of the ink. Other amounts may be present provided that the objectives of the present invention are achieved.

The ink may contain other ingredients in appropriate amounts for their respective functions. For example, humectants may be added to the inks of the present invention. Suitable humectants include, but are not limited to, glycols, N-methyl-pyrrolidone, 2-pyrrolidone, N-methyl-2-pyrrolidone, 1,2,-dimethyl-2-imidazolidinone, mixtures thereof and the like. Humectants may be included in the ink to prevent water evaporation and sedimentation. Additionally, certain humectants such as N-methyl-pyrrolidone and 2-pyrrolidone have been found to improve solubility in the ink and thus serve the dual role as humectant and cosolvent, as described above. in addition, some humectants such as 2-pyrrolidone have been found to resist ink build-up on jet faces during extended printing, which is preferred for cartridge refillability. When incorporated into the inks of the present invention, approximately 1 to 10 percent of one or more humectants by weight may be added to the ink.

In addition, inks of the present invention may include such additives as biocides, buffering agents, anti-mold agents, pH adjustment agents, electric conductivity adjustment agents, chelating agents, anti-rusting agents, and the like. Such additives may be included in the ink jet inks of the present invention in any effective amount, as desired. For example, such additives may be included in an amount ranging from about 0.0001 to about 4.0 percent by weight, and preferably from about 0.01 to about 2.0 percent by weight of the ink. More preferably, such additives may be included in an amount ranging from about 0.01 to about 0.5 percent by weight of the ink and most preferably from about 0.05 to about 0.3 percent by weight. The amount included will depend, of course, on the specific component being included.

Examples of buffering agents include, but are not limited to, agents such as sodium borate, sodium hydrogen phosphate, sodium dihydrogen phosphate, mixtures thereof and the like. Examples of biocides include, but are not limited to, Dowicil™ 150, 200, and 75; benzoate salts; sorbate salts; mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight, and preferably from about 0.01 to about 1 percent by weight.

Other additives may also be added. For example, trimethylol propane may be added to the ink jet ink compositions, for example, to reduce paper curl or as an anti-cockle agent.

Other suitable additives are disclosed, for example, in U.S. Pat. No. 4,737,190 to Shimada et al., the entire disclosure of which is incorporated herein by reference.

Preferably, in embodiments of the present invention, the ink composition and especially the colorant-polymer mixture contained therein are neutrally charged. Thus in embodiments, charge control agents and the like may be added (or excluded) as necessary to neutralize any charge in the ink composition that arises from the presence of other components.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 0.7 to about 15 cP at 25° C. More preferably, the viscosity is from about 1 to about 10 cP, and even more preferably from about 1 to about 5 cP. It is also preferred that the ink jet ink composition has a surface tension of from about 10 to about 75 dynes/cm at 25° C. More preferably, the surface tension is from about 20 to about 70 dynes/cm, and even more preferably from about 25 to about 60 dynes/cm.

The inks of the present invention can be used in an ink jet recording process comprising ejecting ink droplets from an orifice to form an image on a recording medium. The inks have properties that make them jettable and thus suitable for use in a wide variety of ink jet printing processes, such as thermal ink jet, acoustic ink jet, piezoelectric ink jet, and the like.

In an embodiment of the present invention, the ink can be printed on an intermediate substrate, such as a belt or drum, before being transferred to the final recording medium such as paper or transparency to form the recorded image. If a curable ink is used, such as an ink that can advantageously be cured by ultraviolet light, then curing can be initiated while the ink is on the intermediate substrate prior to it being transferred to the recording medium in image configuration. The ink is preferably at least partially cured on the intermediate substrate in order to provide a highly viscous fluid.

Such a fluid having sufficient viscosity will maintain high definition of an image even when transferred to the recording medium. In addition, the viscous fluid can be transferred to a wide range of recording media while maintaining excellent image quality. Further, because an intermediate substrate can be selected that does not have fibers that wick the ink, the need for rapid curing can be decreased, thus providing additional time for ink curing. As a result, a lower power source, which creates less ozone and is thus less hazardous, can be used.

Preferably, the ink used in the process of this embodiment contains a monovinyl monomer, such as ethylene glycol monovinyl ether. In a further preferred embodiment, the monovinyl monomer is mixed with a small amount of water and dye, preferably such that the final ink formulation contains about 1–10% by weight water and about 1–5% by weight dye. Even more preferred, the ink formulation contains about 5% by weight water and 2–4% by weight dye.

The inclusion of water in the ink jet ink aids the ink jet process by acting as a chain transfer agent. In essence, water interferes with the chain growth during curing of the ink, limiting the ultimate length of the chains without necessarily stopping or slowing the overall rate of the polymerization reaction. This allows a viscous fluid, rather than a film, to be formed on the intermediate substrate.

The intermediate substrate should be inert to the components of the ink, the initiator, and the light or other energy source. In addition, the substrate should have low surface energy with respect to the ink to prevent intercolor bleed and facilitate release of the viscous fluid during transfer to the recording medium. In an embodiment, the intermediate substrate may be a polyester substrate, such as a Mylar substrate. For example, the cured ink fluid transfers easily and completely from a Mylar substrate to paper. In addition, once the cured ink fluid is transferred onto the paper, it remains stable. Additionally, a low power Hg curing source, such as a fluorescent type bulb, provides sufficient power to create the viscous fluid on a Mylar substrate.

In another embodiment of the present invention, the initiator used in the process of curing the ink may be kept separate from the curable ink composition until the ink is ejected from the orifice to form an image on the substrate. In an embodiment of this invention, the substrate contains the initiator, for example, in the form of a treated or coated paper stock. In a further embodiment of this invention, the initiator is deposited on the substrate before, while or after the ink is ejected to the substrate.

The initiator is activated on the substrate before, while or after the ink is ejected to the substrate. In a preferred embodiment of the present invention, the initiator is activated before the ink is ejected to the substrate. This embodiment allows polymerization to begin as soon as the ink contacts the initiator on the substrate.

The substrate may be the recording medium or it may be an intermediate substrate as described above. If the substrate is an intermediate substrate, the image may be subsequently transferred to the recording medium after a viscous fluid has been formed by partial curing, as described above.

The multi-step recording process of this embodiment separates the initiator from the polymerizable monomers in the ink and applies them to the substrate in separate steps. As a result, the inks are more stable and will not polymerize in the printhead, regardless of the amount of stray light that reaches the front face or the nozzles. Further, the monomers do not kogate on the heater surface even though they may be heated to high temperatures.

Because an initiator solution in this embodiment does not contain the curable liquid, it is also stable and will not polymerize in the presence of stray light. For some initiators, such as iodonium salts, stray light will cause the initiator to release the acid radical before it is applied to the substrate. However, the photodecomposition reaction is reversible. Therefore, if stray light reaches the initiator, the pH will be lowered temporarily but polymerization will not occur in the initiator solution.

Further, because some stray light can be tolerated, initiators that are activated by visible light can more easily be used. Visible light sources are inherently safer because they do not create ozone and are not harmful to the eyes. Sensitivity to visible light can be accomplished by using photoinitiators that themselves are sensitive to visible light or by including photosensitizer compounds that make a normally ultraviolet sensitive photoinitiator sensitive to visible light. For example, perylene at a low concentration will increase the cure rate of a solution of vinyl ethers and a sulfonium salt by more than one order of magnitude with a photolamp illuminator. J. V. Crivello, *J. of Polymer Science*, 17, 1059 (1979).

In addition, the design of the initiator solution can be engineered for optimum image quality. Whereas the vinyl ether materials are rapid penetrators on paper, the base of the initiator solution can be designed to reduce the penetration rate. Thus, the intensity of the light source that is needed to activate the initiator can be reduced considerably as the time available to initiate the initiator before penetration is greatly increased.

The initiator may be applied to the substrate in any number of ways. For example, it may be applied using an ink jet printhead. Alternatively, the initiator may be applied by a lower resolution printhead than the one used to apply the ink; a non-addressible spray device, such as a mister or an electrospray; a low resolution piezoelectric drive printhead; a continuous pump driven ink jet; and the like. Furthermore, the initiator may be applied by dipping an intermediate substrate in the solution or by capillary action and wetting the surface through an applicator.

The ink jet recording processes described above can also be used with other curable ink jet inks, known in the art, such as those taught above. One having ordinary skill in the art would be able to modify the processes taught herein to use such other curable inks.

The present invention will now be illustrated by reference to the following illustrative examples. All parts and percentages are by weight unless otherwise indicated.

EXAMPLES

Example 1

An ink is prepared by mixing:

95 weight % ethylene glycol monovinyl ether; and 5 weight % Neptune Black carbon black dispersion.

The ink is jetted onto unsubbed Mylar from a Hewlett Packard ("HP") 1200C printer using a depleted and cleaned HP 1200C ink cartridge. Large bubble formation and good jetting are observed. In addition, the ink is waterfast and shows typical behavior for fast dry inks.

Example 2

An ink is prepared and tested according to the procedures of Example 1 except that the ink contains:

90 weight % of ethylene glycol monovinyl ether;

5 weight % water; and 5 weight % Neptune Black.

Large bubble formation and good jetting are observed. In fact, the bubbles formed are as large as those formed using standard water based inks. In addition, the ink is waterfast and shows typical behavior for fast dry inks.

Example 3

An ink is prepared and tested according to the procedures of Example 1 except that the ink contains:

70 weight % diethylene glycol divinyl ether;

20 weight % ethanol;

5 weight % water; and 5 weight % Neptune black.

Large bubble formation and good jetting are observed. In addition, the ink is waterfast and shows typical behavior for fast dry inks.

Example 4

An ink is prepared and tested according to the procedures of Example 1 except that the ink contains:

45 weight % triethylene glycol methyl monovinyl ether;

45 weight % Pluriol-E-200 divinyl ether, i.e., α-ethenyl-ω-(ethyloxy)poly(oxy-1,2-ethanediyl);

5 weight % water; and 5 weight % UVI-6990 photoinitiator (a mixture of sulphonium salts, available from Union Carbide).

Large bubble formation and good jetting are observed. In addition, the ink is waterfast and shows typical behavior for fast dry inks.

Example 5

An ink is prepared in accordance with Example 4. The ink is jetted onto unsubbed Mylar from a HP 1200C printer using a depleted and cleaned HP 1200C print cartridge. The ink is exposed to ultraviolet light for less than 10 seconds using a spectroline shortwave lamp to form a viscous fluid. The viscous fluid is then transferred by hand using light pressure to a plain office paper.

Example 6

An initiator solution is prepared by dissolving 0.5 g of diphenyliodonium hexafluoroarsenate and 0.5 g of Elvacite 2008 (a low molecular weight poly(methyl methacrylate) from dupont) in a mixture of 95 ml of isopropanol and 5 ml of water. The solution is used to coat on unsubbed Mylar by draw bar coating. The deposited initiator coating is then exposed to ultraviolet light in order to activate the initiator.

An ink prepared in accordance with Example 1 is then jetted onto the treated unsubbed Mylar from a HP 1200C printer using a depleted and cleaned HP 1200C print cartridge.

What is claimed is:

1. An ink jet ink comprising a colorant and a liquid component comprising water and at least one compound selected from the group consisting of epoxies and vinyl ethers.

2. The ink of claim 1, wherein said liquid component contains less than 50% by weight water.

3. The ink of claim 1, wherein said liquid component contains from 1 to 10% by weight water.

4. The ink of claim 1, wherein said ink further comprises a photoinitiator.

5. The ink of claim 4, wherein said photoinitiator is selected from the group consisting of a diaryl iodonium salt, a triaryl sulfonium salt, a triphenyl phosphonium salt and derivatives thereof.

6. The ink of claim 1, wherein said compound is a glycol vinyl ether.

7. The ink of claim 6, wherein said liquid component contains from 20 to 50% by weight water.

8. The ink of claim 6, wherein said liquid component further comprises a soluble salt.

9. The ink of claim 6, wherein said colorant is a spirit soluble dye.

10. The ink of claim 6, wherein said glycol vinyl ether is ethylene glycol monovinyl ether.

11. An ink jet ink comprising a colorant and ethylene glycol monovinyl ether.

12. The ink of claim 11, wherein said ink is free of water.

13. An ink jet recording process comprising ejecting ink droplets from an orifice to form an image on a recording medium, wherein said ink comprises a colorant and a liquid component comprising water and at least one compound selected from the group consisting of epoxies and vinyl ethers.

14. The recording process of claim 13, wherein said ink further comprises an initiator.

15. The recording process of claim 14, further comprising exposing the image to light to cure the ink.

16. The recording process of claim 14, comprising:
    (a) ejecting said ink droplets of said ink from said orifice to an intermediate substrate,
    (b) initiating curing of said ink on said intermediate substrate to form a viscous fluid, and
    (c) transferring said viscous fluid to the recording medium.

17. The recording process of claim 16, further comprising:
    (d) further curing said ink on said recording medium.

18. The recording process of claim 13, comprising:
    (a) activating an initiator on a substrate, and
    (b) ejecting ink droplets of said ink from said orifice to said substrate to form said image.

19. An ink jet recording process comprising:
    (a) ejecting ink droplets of a curable ink from an orifice to form an image on an intermediate substrate,
    (b) initiating curing of said curable ink on said intermediate substrate to form a viscous fluid, and (c) transferring said viscous fluid to the recording medium.

20. The recording process of claim 19, wherein said intermediate substrate is a polyester substrate.

21. The process of claim 19, wherein said ink comprises a colorant and a liquid component comprising a compound selected from the group consisting of epoxies and vinyl ethers.

22. The recording process of claim 21, wherein said compound is a monovinyl ether.

23. The process of claim 21, wherein said ink further comprises water.

24. The recording process of claim 22, wherein said monovinyl either is ethylene glycol monovinyl either.

25. An ink jet recording process comprising:
(a) activating an initiator on a substrate, and
(b) ejecting ink droplets of a curable ink from an orifice to form an image on said substrate.

26. The process of claim 25, wherein said ink comprises a colorant and a liquid components comprising a compound selected from the group consisting of epoxies and vinyl ethers.

27. The process of claim 26, wherein said ink further comprises water.

28. The process of claim 26, wherein said ink further comprises an initiator.

29. The recording process of claim 25, wherein said initiator is applied on said substrate.

30. The recording process of claim 25, wherein said initiator is activated before the ink droplets are ejected from said orifice to said substrate.

31. The recording process of claim 25, wherein said substrate is the recording medium.

32. The recording process of claim 18, further comprising:
(d) curing said ink to form a viscous fluid, and
(e) transferring said viscous fluid to the recording medium.

* * * * *